United States Patent
Herrmann et al.

(10) Patent No.: US 10,293,753 B2
(45) Date of Patent: May 21, 2019

(54) REARVIEW ASSEMBLY FOR A MOTOR VEHICLE

(71) Applicant: SMR Patents S.à.r.l., Luxembourg (LU)

(72) Inventors: Andreas Herrmann, Winnenden-Baach (DE); Artem Rudi, Ludwigsburg (DE)

(73) Assignee: SMR Patents S.à.r.l., Luxembourg (LU)

( * ) Notice: Subject to any disclaimer, the term of this patent is extended or adjusted under 35 U.S.C. 154(b) by 0 days.

(21) Appl. No.: 15/914,181

(22) Filed: Mar. 7, 2018

(65) Prior Publication Data
US 2018/0257567 A1     Sep. 13, 2018

(30) Foreign Application Priority Data
Mar. 7, 2017    (DE) .......................... 10 2017 104 755

(51) Int. Cl.
| | |
|---|---|
| *A47G 1/24* | (2006.01) |
| *B60R 1/02* | (2006.01) |
| *B60R 1/06* | (2006.01) |
| *B60R 1/076* | (2006.01) |

(52) U.S. Cl.
CPC ............... *B60R 1/06* (2013.01); *B60R 1/076* (2013.01)

(58) Field of Classification Search
CPC ........................................................ B60R 1/06
USPC .............. 248/205.1, 483, 486; 350/632, 639
See application file for complete search history.

(56) References Cited

U.S. PATENT DOCUMENTS

| | | | | |
|---|---|---|---|---|
| 5,022,748 | A  * | 6/1991 | Espirito Santo ...... | B60R 1/0617 248/486 |
| 5,477,392 | A  * | 12/1995 | Mochizuki .............. | B60R 1/074 248/478 |
| 6,488,382 | B1 | 12/2002 | Mertens | |
| 6,609,800 | B2 | 8/2003 | Assinder et al. | |
| 7,354,165 | B1 * | 4/2008 | Ruse ....................... | B60R 1/076 248/478 |
| 7,490,946 | B1 * | 2/2009 | Foote ........................ | B60R 1/06 248/478 |
| 2017/0106799 | A1 * | 4/2017 | Di Gusto ................ | B60R 1/076 |

FOREIGN PATENT DOCUMENTS

| | | |
|---|---|---|
| DE | 11 2007 000 230 T5 | 2/2009 |
| DE | 10 2010 054 372 A1 | 6/2012 |
| DE | 10 2011 079 251 A1 | 1/2013 |
| EP | 0 221 255 A2 | 5/1987 |
| EP | 1 373 019 B1 | 1/2004 |

OTHER PUBLICATIONS

Office Action of DE 10 2017 104 755.7 of the German Patent and Trademark Office dated Aug. 8, 2017.

* cited by examiner

*Primary Examiner* — Gwendolyn W Baxter
(74) *Attorney, Agent, or Firm* — Jones Day

(57) ABSTRACT

A rearview assembly for a motor vehicle includes a dome, a foot attachable to the motor vehicle, a head rotatable relative to the foot, the head including at least one base body with a bearing opening for receiving an axis of rotation associated with the foot, where the foot is shaped together with the dome as an injection molded part, the dome includes at least one first stop element for engagement with at least one complementary second stop element of a cap nut screwed onto the dome, the cap nut providing a stop for a spring which extends around the dome, and the cap nut is an injection molded part.

11 Claims, 2 Drawing Sheets

REARVIEW ASSEMBLY FOR A MOTOR VEHICLE

CROSS-REFERENCE TO RELATED APPLICATION

This application claims the benefit of foreign priority to German Patent Application No. DE 10 2017 104 755.7 filed Mar. 7, 2017, which is incorporated herein by reference in its entirety for all purposes.

BACKGROUND

1. Field of the Invention

The following description relates to a rearview assembly for a motor vehicle. A rearview assembly may include a foot attachable to the motor vehicle, and a head rotatable relative to the foot, the head having at least one base body with a bearing opening for receiving an axis of rotation associated with the foot. A rearview assembly includes exterior rearview assemblies, rearview camera assemblies, among other rearview assemblies.

2. Related Art

Rearview assemblies for motor vehicles typically include a foot which is attached to the body of the motor vehicle, and a head which is pivotally connected to the foot. In case of an outside rearview mirror, the head carries a mirror glass. Due to the articulated connection, such a rearview assembly swivels at least between a folded in position, in which the head rests on the motor vehicle, and a folded out or rather operating position, in which the head is pivoted outwards and allows the rearward view.

A generic rearview assembly is known for example from German Patent Application No. DE 10 2010 054 372 A1. According to this example, the articulated connection includes a pin providing a hinge axis which is part of the mirror foot and is accommodated in a recess forming a joint socket. Around the pin, a coil spring is guided to generate a biasing force, and the spring is fixed with a pressure plate made of metal. A sliding disc supports the coil spring against a base body of the mirror head to allow a smooth, low-noise and low-friction pivoting of the rearview assembly.

U.S. Pat. No. 6,488,382 B1 describes an exterior rearview mirror for motor vehicles with a mirror base to be fastened to the vehicle and with a mirror head connected to the mirror base. The mirror base is latched to the mirror head via at least one catch element. The catch element may be provided on a projection of a support of the mirror head. The free ends of the catch elements, which are in the front in the insertion direction of the mirror head and/or its support are preferably designed as outwardly projecting latch cams, which engage behind an inwardly projecting edge of a reception of the mirror base. At least the catch elements of the projection can be biased radially outward under the force of at least one spring where the mounted position an annular spring is arranged within the projection of the support. The support can be made of plastic, and the spring is usually made of metal.

U.S. Pat. No. 6,609,800 describes a vehicle door mirror having a housing. The housing connects to a vehicle door via a stem. An intermediate member is inserted between the housing and the vehicle door to effect relatively smooth abutment between the intermediate member and each of the housing and the vehicle door. The cylindrical stem extends from the housing through the intermediate member and through the vehicle door. The stem includes primary engagement members to engage with complementary engagement members formed in a mounting hole of the door. The engagement members prevent removal from the mounting hole when the stem is in a predetermined orientation. A spring is compressed between the housing and the stem to cause retraction of the stem inward of the housing. Such inward movement urges the primary engagement members into engagement with the complementary engagement members.

European Patent No. 1 373 019 B1 describes a pivot assembly for a vehicle external mirror having a mirror base mounted to a mirror head. The assembly includes a first member having a first detent side, a first inner side and a first aperture extending from the first detent side to the first inner side, a second member having a second detent side, a second inner side and a second aperture extending from the second detent side to the second inner side, the second member being positioned with respect to the first member such that the second detent side is facing the first detent side and the first and second apertures are aligned. The first and second members are mountable in either the base and the head respectively or the mirror head and the mirror base respectively. A detent means is positioned between the first detent side and the second detent side, the detent means operable to hold the mirror head in a deployed position with respect to the mirror base. The assembly further includes a spigot having a shaft and a head depending from the shaft, the shaft passing through the first and second apertures thereby providing a pivot axis about which the second member can rotate with respect to the first member, a spring adapted and positioned around the spigot to bias the first and second sides towards each other and therefore to hold the detent means engaged thereby restraining movement of the mirror head with respect the mirror base, and a means for applying a pre-load to the spring. The means for applying a pre-load to the spring includes a means for locking the spigot against rotation with respect to the first member before the spring is pre-loaded, an arm projecting radially from the head of the spigot, a spigot guide on or adjacent the second inner side, the spigot guide including a ramped surface adapted to receive the radially projecting arm so as to cause the spigot head to move axially away from the first member before the spring is fully pre-loaded as the second member rotates in the first direction with respect to the spigot and the first member, and a means for locking the spigot against rotation with respect to the second member after the spring is pre-loaded where the initial relative rotation between the second member and the first member in a first direction causes loading of the spring and the load is retained as a pre-load during subsequent relative rotations between the second member and the first member.

European Patent Application No. 0 221 255 A3 relates to a vehicle mirror having a mirror foot which is to be fastened to the vehicle and to which a mirror arm is pivotably mounted about a substantially vertical axis, the hinge including a vehicle-side holder and an arm support rotatably mounted thereon, the arm support having a cavity communicating with a cavity of the holder in any possible position of the arm support and guiding at least one cable through the two cavities into the interior of the tubular arm.

German Patent No. DE 11 2007 000 230 T5 describes a vehicle exterior rear-view mirror including a casing or chassis with a neck to which an adaptor is mated. The adaptor has an abutment surface adapted to abut against a support sheet element associated to an outer panel of the vehicle. The support sheet element has an opening aligned with respective passages of the casing and the adaptor, respectively. A coupling stem is installed through the passages with the possibility of rotation and axial movement. Anchor configurations are formed at a lower end of the stem, the configurations engaging portions of the lower face of the support sheet element adjacent to the opening. An elastic element is arranged between the casing and the stem to push the stem inwards the casing or chassis.

Known rearview assemblies are often expensive to manufacture, especially since they usually include a large number of parts made of different materials. For example, metal parts are combined with plastic parts in prior art pivot mechanisms for a rearview assembly.

Fastening systems are widely known such as a fastening system for attaching a line to a household appliance, as described in German Patent Application No. DE 10 2011 079 251 A1.

SUMMARY

This Summary is provided to introduce a selection of concepts in a simplified form that are further described below in the Detailed Description. This Summary is not intended to identify key features or essential features of the claimed subject matter, nor is it intended to define the scope of the claimed subject matter.

A generic rearview assembly may be developed in such a way to provide a structurally simple and cost-effective rearview assembly for a motor vehicle.

In an aspect, a foot of a rearview assembly is shaped together with a dome as an injection molded part, the dome has at least one first stop element, which is suited for engagement with at least one complementary second stop element of a cap nut, which can be screwed onto the dome, wherein the cap nut presents a stop for a spring, which extends around the dome, and the cap nut is an injection molding part.

Each first stop element can be frictionally and/or positively locked to each second stop element, where preferably one of the stop elements constitutes a latch cam and the other of the stop elements has a flexible portion.

The dome can be hollow cylindrical and can have an interior for receiving the axis of rotation.

The first stop element may be formed as a latch cam on an outer circumferential surface of the dome and in one piece with the dome.

The second stop element may protrude from an end face of the cap nut, where the second stop member has a rigid region which is connected to the cap nut, and a flexible region being an end portion.

The flexible region of the second stop element can lock with the first stop element with formation of a radial biasing force.

The spring may be provided in form of a coil spring, and the cap nut may have a radially projecting collar which constitutes the stop for the coil spring extending around the dome, where the collar has an end face serving as pressure disc.

The cap nut can be a self-locking plastic part and/or can be made by a 2K injection molding process.

The rigid region can be stiffened and/or made of a different plastic than the flexible portion.

The cap nut can have an internal thread and the dome can have an external thread complementary to the internal thread at its end extending away from the foot.

A rearview assembly includes an exterior rearview and/or rearview camera assembly. The rearview assembly may include further components, for example a flashing light, an entrance light, heatable or electrochromatically dimmable mirror elements, detection and display modules for a driver assistance device, for example for blind spot monitoring, a lane assist system, proximity monitoring or the like, or also sensors for detecting driving conditions or environmental conditions such as brightness, temperature or humidity.

The rearview assembly may be formed with a particularly small number of parts to allow pivoting of the head against the foot and at the same time allows a secure locking of the head and foot at least in the respective end stops—i.e. the folded in as well as folded out position. The rearview assembly is therefore particularly cost-effective to manufacture and assembly.

In a preferred example, the stop elements are designed as latching elements. The stop elements, therefore, do not only define an end position of the pivoting movement between the head and foot, but lock the rearview assembly in this end position so that there can be no undesirable displacement.

Preferably, the first and the second stop element are connected by engagement. In other words, one of the stop elements engages in an opening of the other in order to realize a particularly secure connection. Alternatively, one of the stop elements can embrace or overlap the other, or it can cooperate with another element of the head or foot across in an embracing or overlapping manner.

It is further preferred that the first stop element is formed on a pivot axis providing or receiving dome. The dome can thus simultaneously assume the function of a bearing bush or socket, so that the number of parts required can be particularly low. In this case, the dome is, for example, a hollow cylindrical receptacle for the axis of rotation, so that it is reliably held with a simple structural design.

The first stop element may be designed as a latch cam on an outer lateral surface of the dome. The complementary second stop element can then project radially outward beyond the dome so that it comes into operative connection with the first stop element when the cap nut is put on and twisted.

The first stop element and the dome may be formed in one piece, in particular as an injection molded part, with the foot. This allows a particularly simple and fast production. In particular, the dome can be manufactured with the stop element to allow a machine production. By saving post-processing steps, as they are necessary for example in known metal parts, the production is particularly cost attractive.

The second stop element may protrude from an end face of the cap nut. The cap nut is thus received on the axis of rotation, such that this end face faces the first stop element on the side of the foot. By attaching the nut on the axis and turning the same, the stop elements are brought into operative connection, and head and foot of the rearview assembly are easily secured against each other.

It is preferred that the second stop element have a rigid region which is connected to the cap nut, and a flexible end region. The rigid area transfers forces acting on the stop element in a basic body of the cap nut and gives the stop element the necessary stability. The flexible end portion, however, can be deformed during assembly of the rearview assembly to a predetermined extent to create a stronger adhesion between the stop elements.

It is also advantageous that the flexible end region of the second stop element engages with the formation of a radial biasing force with the first stop element. For this purpose, the flexible end region can, for example, embrace the dome having the first stop element formed thereon. By the resulting expansion of the second stop element, a radial force is formed, which improves the grip between the stop elements.

In a further preferred embodiment, the cap nut has a radially projecting collar. This can serve as a stop for other elements of the rearview assembly. For example, a coil spring arranged around the axis of rotation, or rather the dome, can be supported on this collar in order to also ensure axial pre-stressing. An additional pressure disc for compressing the coil spring, such as described in German Patent Application No. DE 10 2010 054 372 A1, can be omitted this way. Thus, the number of components required for the rearview assembly is further reduced, so that the production is particularly simple and inexpensive.

It is advantageous that the cap nut is a plastic part, in particular an injection molded part. The simple production in only one process step makes the component particularly favorable. Also for cap nuts with the described solid and flexible regions, the production by injection molding is suitable. Here, for example, the flexible end region can be injection molded in a two-component process. But it is also possible to realize differences in the flexibility of the areas only by their geometric design. For example, rigid areas may be provided with additional stiffening ribs or the like.

In a further preferred embodiment, the first stop element and the second stop element are frictionally and/or positively latched. The combination of positive locking and traction gives the rearview assembly a particularly secure hold.

BRIEF DESCRIPTION OF THE DRAWINGS

The foregoing summary, as well as the following detailed description, will be better understood when read in conjunction with the appended drawings. For the purpose of illustration, certain examples of the present description are shown in the drawings. It should be understood, however, that the invention is not limited to the precise arrangements and instrumentalities shown. The accompanying drawings, which are incorporated in and constitute a part of this specification, illustrate an implementation of system, apparatuses, and methods consistent with the present description and, together with the description, serve to explain advantages and principles consistent with the invention.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

In addition, it is to be understood that the phraseology and terminology employed herein are for the purpose of description and should not be regarded as limiting. For example, the use of a singular term, such as, "a" is not intended as limiting of the number of items. Further, it should be understood that any one of the features can be used separately or in combination with other features. Other systems, methods, features, and advantages of the invention will be or become apparent to one with skill in the art upon examination of the detailed description. It is intended that all such additional systems, methods, features, and advantages be included within this description, be within the scope of the present invention, and be protected by the accompanying claims.

Figure 1:
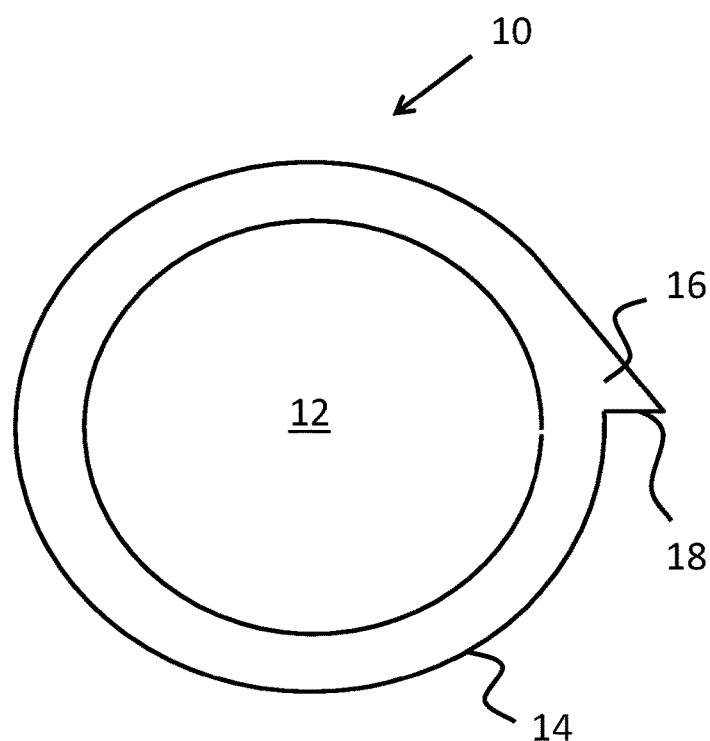
FIG. 1 is a diagram illustrating a schematic sectional view through a dome with a first stop element for an example of a rearview assembly.

A dome 10, as shown in FIG. 1, is connected to a foot of a rearview assembly. The dome 10 has a hollow cylindrical interior 12, so that material and weight are reduced. It represents an axis of rotation or can form a bearing bush for the same. From an outer circumferential surface 14 of the dome 10 protrudes a latch cam 16, which forms a radial abutment surface 18.

Figure 2:
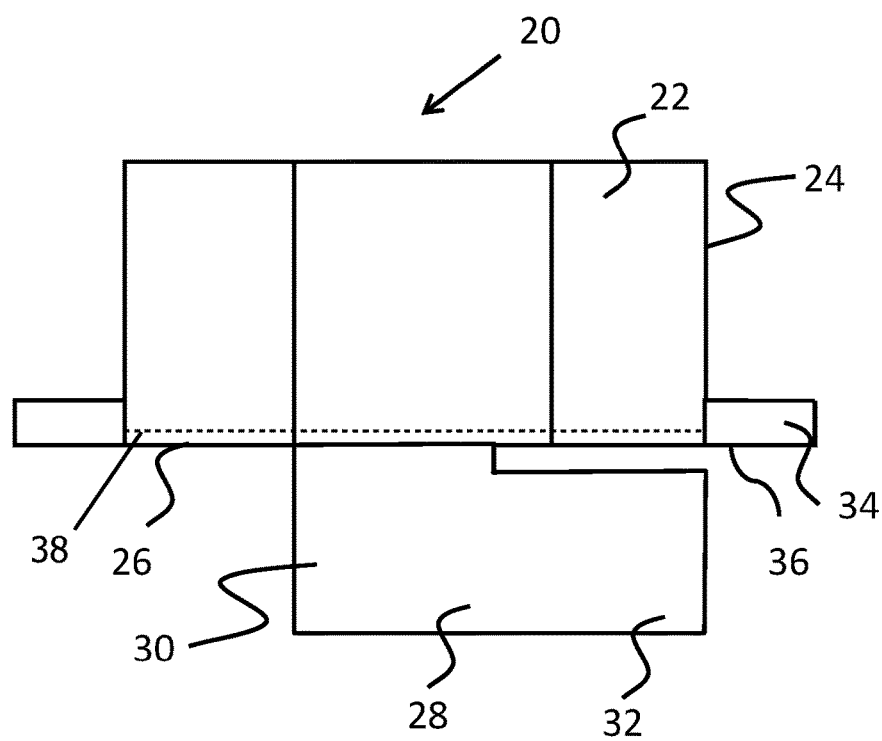
FIG. 2 is diagram illustrating a schematic side view of a cap nut with a second stop element for an example of a rearview assembly.

The dome 10 is formed at its end facing away from the foot with an external thread (not shown), as a plastic part. To assemble the rearview assembly, the dome 10 may be guided through a bearing opening of a main body (not shown) of the head, a coil spring 38 is arranged around the dome 10, and the cap nut 20, as illustrated in FIG. 2, is attached to the dome 10 above the coil spring 38. By rotating the cap nut 20, the components are secured against each other.

The cap nut 20 includes a base body 22 which has a through opening, not visible in the side view, for receiving the axis of rotation together with the dome 10. The outer circumferential surface 24 of the base body 22 preferably has a hexagonal profile in cross-section, so that the cap nut 20 can be mounted with conventional tools and so that it can be screwed. For this purpose, the cap nut 20 may have an internal thread complementary to an external thread of the dome 10.

At a lower end face 26 of the base body 22, a stop element 28 is attached. This is connected to the base body 22 with a rigid portion 30. A flexible portion 32 forms an end portion of the stop member 28 which may extend radially beyond the body 22. The relative flexibility of the flexible portion 32 and the rigid portion 30 can be adjusted via the geometry of the respective sections, for example, by additional reinforcing ribs for stiffening or by recesses that increase the flexibility. Alternatively or additionally, different materials, for example different plastics, can be used for the two rigid and flexible portions 30, 32. This can be done in a single step, for example, by multi-component injection molding.

Further, on the base body 22, a circumferential collar 34 may be formed which protrudes radially from the base body 22. An end face 36 of the collar 34 may serve as a stop surface for the coil spring 38 on the dome 10 for generating an axial bias by compressing the coil spring 38.

Figure 3:
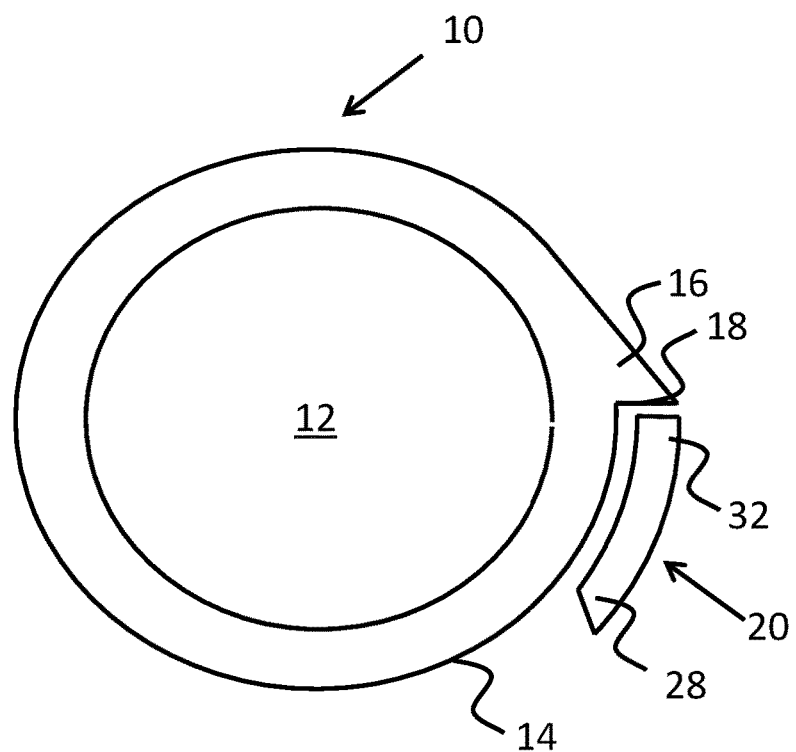
FIG. 3 is diagram illustrating a schematic sectional view of the dome of FIG. 1 and the cap nut of FIG. 2 in mechanical engagement with each other.

If the cap nut 20 is placed on the dome 10 and screwed to the same then the FIG. 3 cross-section results. The stop element 28 of the cap nut 20 engages over the outer circumferential surface 14 of the dome 10. In this case, the flexible portion 32 of the stop element 28 can be slightly expanded so that there is a radial bias between the dome 10 and the cap nut 20. In order to prevent over-rotation, the stop member 28 may abut against the end face 18 of the latch cam 16 when the connection between the cap nut 20 and the dome 10—and thus between the head and foot of the rearview assembly—is adequately secured. The main body 22 of the cap nut 20 is illustrated in FIG. 3 above the plane of the paper.

Overall, a structural simple distortion lock for a rearview assembly is created which only needs a very small number of components. In particular, no additional pressure discs or securing forks are necessary, as they are described in the prior art. Furthermore, both the dome 10 and the cap nut 20 can be manufactured as plastic parts. Accordingly, injection molding may be suitable which allows a machine production of the dome 10 and the cap nut 20 without further post-processing steps. The dome 10 can be made together with the foot. Thus, the production of the rearview assembly is particularly cost-saving. At the same time, the assembly and repair of such a rearview assembly is particularly simple due to the simple structure.

It will be appreciated by those skilled in the art that changes could be made to the embodiments described above without departing from the broad inventive concept thereof. It is understood, therefore, that the invention disclosed herein is not limited to the particular embodiments disclosed, and is intended to cover modifications within the spirit and scope of the present invention.

LIST OF REFERENCE SIGNS

10 dome
12 interior
14 lateral surface
16 latch cams
18 stop face
20 cap nut
22 base
24 lateral surface
26 end face
28 stop element
30 rigid region
32 flexible region
34 collar
36 end face

What is claimed is:

1. A rearview assembly for a motor vehicle, comprising:
a dome;
a foot attachable to the motor vehicle; and
a head rotatable relative to the foot, the head comprising at least one base body with a bearing opening for receiving an axis of rotation associated with the foot, wherein
the foot is shaped together with the dome as an injection molded part,
the dome comprises at least one first stop element for engagement with at least one complementary second stop element of a cap nut screwed onto the dome, the cap nut providing a stop for a spring which extends around the dome, and
the cap nut is an injection molded part.

2. The rearview assembly according to claim 1, wherein each of the at least one first stop element is configured to be at least one of frictionally and positively locked to each of the at least one complementary second stop element, and one of the at least one first stop element and the at least one complementary second stop element is a latch cam and the other of the at least one first stop element and the at least one complementary second stop element comprises a flexible portion.

3. The rearview assembly according to claim 1, wherein the dome comprises a hollow cylindrical interior for receiving the axis of rotation.

4. The rearview assembly according to claim 1, wherein the at least one first stop element is a latch cam on an outer lateral surface of the dome and is formed integrally with the dome.

5. The rearview assembly according to claim 1, wherein the at least one complementary second stop element protrudes from an end face of the cap nut, and the at least one complementary second stop element comprises a rigid region connected to the cap nut and a flexible region being an end portion.

6. The rearview assembly according to claim 5, wherein the flexible region of the at least one complementary second stop element locks with the at least one first stop element by a radial biasing force.

7. The rearview assembly according to claim 5, wherein the rigid region is stiffened or made of a different plastic than the flexible region.

8. The rearview assembly according to claim 1, wherein the spring is a coil spring, and the cap nut comprises a radially projecting collar which forms the stop for the coil spring extending around the dome.

9. The rearview assembly according to claim 8, wherein the collar has an end face serving as pressure disc.

10. The rearview assembly according to claim 1, wherein the cap nut is a self-locking plastic part or the cap nut is formed by a 2K injection molding process.

11. The rearview assembly according to claim 1, wherein the cap nut comprises an internal thread and the dome comprises an external thread complementary to the internal thread at an end of the dome which extends away from the foot.

* * * * *